United States Patent
Masumoto et al.

(10) Patent No.: US 8,659,602 B2
(45) Date of Patent: Feb. 25, 2014

(54) GENERATING A PSEUDO THREE-DIMENSIONAL IMAGE OF A THREE-DIMENSIONAL VOXEL ARRAY ILLUMINATED BY AN ARBITRARY LIGHT SOURCE BY A DIRECT VOLUME RENDERING METHOD

(75) Inventors: Jun Masumoto, Ichikawa (JP); Masaki Miyamoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1183 days.

(21) Appl. No.: 12/100,790

(22) Filed: Apr. 10, 2008

(65) Prior Publication Data

US 2008/0259080 A1  Oct. 23, 2008

(30) Foreign Application Priority Data

Apr. 12, 2007  (JP) ................................. 2007-105198

(51) Int. Cl.
    *G06T 15/50* (2011.01)
(52) U.S. Cl.
    USPC ........................................................ 345/426
(58) Field of Classification Search
    USPC ........................................................ 345/426
    See application file for complete search history.

(56) References Cited

U.S. PATENT DOCUMENTS

| | | | | |
|---|---|---|---|---|
| 4,737,921 A * | 4/1988 | Goldwasser et al. | ......... | 345/421 |
| 5,499,323 A * | 3/1996 | Doi et al. | ....................... | 345/426 |
| 6,211,884 B1 * | 4/2001 | Knittel et al. | ................. | 345/424 |
| 6,940,507 B2 * | 9/2005 | Repin et al. | .................... | 345/424 |
| 2004/0125103 A1 * | 7/2004 | Kaufman et al. | ............. | 345/419 |
| 2004/0263511 A1 * | 12/2004 | West et al. | .................... | 345/421 |
| 2007/0002047 A1 * | 1/2007 | Desgranges et al. | .......... | 345/426 |
| 2007/0053553 A1 * | 3/2007 | Gerritsen et al. | ............. | 382/128 |

FOREIGN PATENT DOCUMENTS

| | | |
|---|---|---|
| JP | 2003-091735 | 3/2003 |
| JP | 2006-338 A | 1/2006 |

* cited by examiner

*Primary Examiner* — Edward Martello
(74) *Attorney, Agent, or Firm* — Birch, Stewart, Kolasch & Birch, LLP

(57) ABSTRACT

In an image processing method for generating a pseudo three-dimensional image by a volume rendering method in which a pixel value of each pixel on a projection plane on which a three-dimensional image illuminated by an arbitrary light source is projected is determined using a brightness value at each examination point, which is a point on the three-dimensional image sampled along each of a plurality of visual lines connecting an arbitrary viewpoint and each pixel on the projection plane, an illuminance level at each examination point is calculated based on an opacity level at each calculation point, which is a point on the three-dimensional image sampled along each of a plurality of light rays connecting the light source and each examination point, and the brightness value at each examination point is determined based on the calculated illuminance level.

5 Claims, 3 Drawing Sheets

GENERATING A PSEUDO THREE-DIMENSIONAL IMAGE OF A THREE-DIMENSIONAL VOXEL ARRAY ILLUMINATED BY AN ARBITRARY LIGHT SOURCE BY A DIRECT VOLUME RENDERING METHOD

BACKGROUND OF THE INVENTION

1. Field of the Invention

The present invention relates to an image processing method and apparatus for generating a pseudo three-dimensional image from three-dimensional image data of a group of multitudes of two-dimensional images by a volume rendering method. The invention also relates to a computer readable recording medium on which a program for causing a computer to perform the image processing method is recorded.

2. Description of the Related Art

In order to facilitate understanding of a three-dimensional structure and the like of a subject, a pseudo three-dimensional image generation and display process is performed, in which three dimensional image data of the subject constituted by a group of multitudes of two-dimensional images obtained by CT equipment, MRI machine, ultrasonic diagnostic equipment, and the like are stereoscopically visualized on a two-dimensional plane using computer graphics technology or the like.

As for the method of generating such pseudo three-dimensional image, a volume rendering method is known as described, for example, in Japanese Unexamined Patent Publication No, 2006-000338, in which an opacity level and R, G, B color information are allocated to each voxel constituting a three-dimensional image, and voxel tracing (ray casting) is performed from the observation side to each pixel on the projection plane, thereby an internal tissue structure of a subject, as well as the interface between tissues, is visualized through multiple layers.

In the volume rendering method, a "shading" process is performed in which an arbitrary light source is set, and a three-dimensional appearance is represented based on the relationship between an incident direction of light from the light source incident on an arbitrary point on a three-dimensional image illuminated by the light source and an inclination of a plane defined by a gradient of pixel values at the point. More specifically, a brightness value b(Pv) at an arbitrary point Pv on the three-dimensional image is calculated by multiplying color information c(Pv) allocated based on predefined color information with respect to each tissue (each input pixel value, such as hounsfield number) of a subject with a vector inner product between the normal vector N(Pv) to a plane defined by a gradient of pixel values at the point Pv and a unit vector L from the point Pv to the light source, as shown in formula (2) below.

$$b(P_v) = h(N(P_v) \cdot L) \times c(P_v) \qquad (2)$$

where h is the shading coefficient by diffusion reflection.

In the conventional shading process described above, however, attenuation of illuminance caused by the blockage of light emitted from the light source toward each point on a three-dimensional image by any other subject image is not considered. Consequently, as shown in FIG. 6A, in a case where a portion of light emitted from a light source S for illuminating a subject B is blocked by a subject A and a shadow of the subject A should appear on the subject B, for example, a pseudo three-dimensional image $I_2$ generated by the volume rendering gives rise to a problem that the image is unnatural since such shadow is not rendered, as shown in FIG. 6B.

In view of the circumstances described above, it is an object of the present invention to provide an image processing method and apparatus capable of improving the fidelity of a pseudo three-dimensional image generated by the volume rendering method. It is a further object of the present invention to provide a computer readable recording medium on which a program therefor is recorded.

SUMMARY OF THE INVENTION

The image processing method of the present invention is a method for generating a pseudo three-dimensional image by a volume rendering method in which a pixel value of each pixel on a projection plane on which a three-dimensional image illuminated by an arbitrary light source is projected is determined using a brightness value at each examination point, which is a point on the three-dimensional image sampled along each of a plurality of visual lines connecting an arbitrary viewpoint and each pixel on the projection plane, the method including the steps of:

calculating an illuminance level at each examination point based on an opacity level at each calculation point, which is a point on the three-dimensional image sampled along each of a plurality of light rays connecting the light source and each examination point; and determining the brightness value at each examination point based on the calculated illuminance level.

The term "three-dimensional image" as used herein means a virtual three-dimensional image formed of three-dimensional image data of a group of multitudes of two-dimensional images, and the term "pseudo three-dimensional image" as used herein means a two-dimensional image which is generated by the volume rendering method and visualized three dimensionally.

The image processing apparatus of the present invention is an apparatus for generating a pseudo three-dimensional image by a volume rendering method having a ray casting means for determining a pixel value of each pixel on a projection plane on which a three-dimensional image illuminated by an arbitrary light source is projected using a brightness value at each examination point, which is a point on the three-dimensional image sampled along each of a plurality of visual lines connecting an arbitrary viewpoint and each pixel on the projection plane, the apparatus including:

an illuminance level calculation means for calculating an illuminance level at each examination point based on an opacity level at each calculation point, which is a point on the three-dimensional image sampled along each of a plurality of light rays connecting the light source and each examination point; and a brightness value determination means for determining the brightness value at each examination point based on the calculated illuminance level.

The image processing program of the present invention is a program for causing a computer to perform the image processing method described above.

In the method, apparatus, and program described above, if each of the visual lines is represented by visual line $E_j$ (j=1, 2, - - -, L), each examination point, which is a point on the three-dimensional image sampled along the visual line $E_j$, is represented by examination point $P_{ji}$ (i=1, 2, - - -, n), each calculation point, which is a point on the three-dimensional image sampled along the light ray connecting the light source and the examination point $P_{ji}$, is represented by calculation point $q_k$ (k=1, 2, - - - , m), and the opacity level at the calculation point $q_k$ is represented by $\alpha(q_k)$, an illuminance level D ($P_{ji}$) at the examination point $P_{ji}$ may be calculated by formula (1) below.

$$D(P_{ji}) = \prod_{k=1}^{m} (1 - \alpha(q_k)) \quad (1)$$

where L is the number of visual lines, n is the number of examination points on the visual line $E_j$, and m is the number of calculation points on the ray connecting the light source and the examination point $P_{ji}$.

According to the image processing method, apparatus, and program of the present invention, when generating a pseudo three-dimensional image by the volume rendering method, a shading process in which luminance attenuation at each point on a three-dimensional image caused by blockage of light emitted from the light source toward each point by any other subject image is considered, so that a high fidelity pseudo three-dimensional image may be generated.

DESCRIPTION OF THE PREFERRED EMBODIMENTS

Hereinafter, an exemplary embodiment of the present invention will be described with reference to the accompanying drawings.

Figure 1:
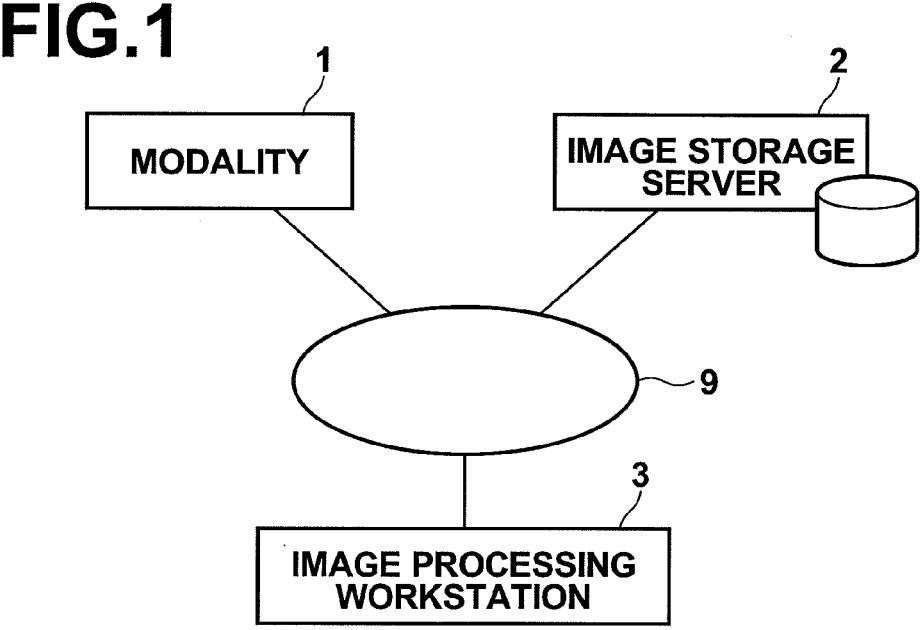
FIG. 1 is a schematic configuration diagram of a three-dimensional medical image processing system according to an embodiment of the present invention.

FIG. 1 is a hardware configuration diagram of a three-dimensional medical image processing system, illustrating an overview thereof. As illustrated, the system includes a modality 1, an image storage server 2, and an image processing workstation 3, which are communicatably connected with each other through a network 9.

The modality 1 is used for obtaining a three-dimensional medical image V representing a subject, which is, more specifically, CT equipment, MRI machine, ultrasonic diagnostic equipment, or the like.

The image storage server 2 is a computer for storing a three-dimensional medical image V obtained by the modality 1 and a medical image generated through image processing in the image processing workstation 3 in an image database and managing them. The image storage server 2 includes a large capacity external storage device, and database management software (e.g., ORDB (Object Relational Database) management software).

The image processing workstation 3 is a computer for performing image processing on a three-dimensional medical image V obtained from the modality 1 or the image storage server 2, and displaying the generated image in response to a request from a radiological reader. The image processing workstation 3, in particular, includes an input device, such as a keyboard, a mouse, or the like, for inputting a request from a radiological reader, a main storage unit having a sufficient capacity for storing the obtained three-dimensional medical image V, and a display for displaying the generated image.

The image data storage format and communication between each unit through the network 9 are based on a protocol, such as DICOM (Digital Imaging and Communications in Medicine) or the like.

Figure 2:
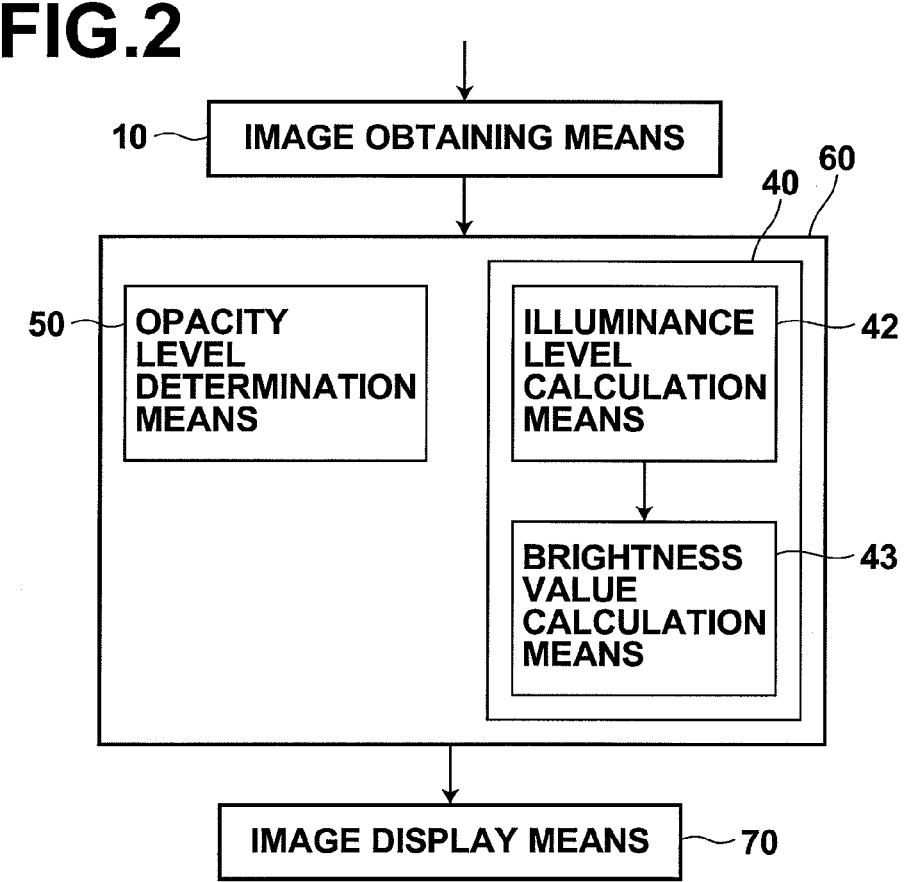
FIG. 2 is a block diagram illustrating the volume rendering function of the image processing workstation shown in FIG. 1.

FIG. 2 is a block diagram illustrating a portion of the image processing workstation 3 related to the volume rendering function. As illustrated, the image processing workstation 3 includes an image obtaining means 10 for obtaining a three-dimensional medical image V of a target patient for radiological reading from the modality 1 or image storage server 2 in response to a request from a radiological reader, a ray casting means 60 for determining a pixel value of each pixel on a projection plane using brightness values and opacity levels of a plurality of examination points, which are points on the three-dimensional medical image V sampled at a predetermined interval along each of a plurality of visual lines connecting an arbitrary viewpoint and each pixel on the projection plane and generating a volume rendering image (pseudo three-dimensional image), and an image display means 70 for displaying the generated volume rendering image. The ray casting means 60 includes a brightness value determination means 40 and an opacity level determination means 50 for determining a brightness value and an opacity level at each examination point respectively. The brightness value determination means 40 includes an illuminance level calculation means 42 for calculating an illuminance level at each examination point based on an opacity level of each calculation point, which is a point on the three-dimensional medical image V sampled along each of a plurality of light rays connecting the light source and each examination point, and a brightness value calculation means 43 for calculation a brightness value at each examination point based on the calculated illuminance level.

Next, a processing flow of the medical image processing system, in particular, a processing flow of the image processing workstation 3 for generating a volume rendering image will be described.

First, the image obtaining means 10 obtains a three-dimensional medical image V of a target patient for radiological reading from the modality 1 or image storage server 2 in response to a request from a radiological reader. The three-dimensional medical image V is constituted by multi slice images which are divided into voxels and arranged in a three-dimensional coordinate space. The position of each voxel is defined by a three-dimensional coordinate system with the left-right directions, front-back directions, and up-down directions of the subject as the x axis, y axis, and z axis respectively, and pixel values of each voxel are associated with the coordinates of the position of the voxel.

Figure 3:
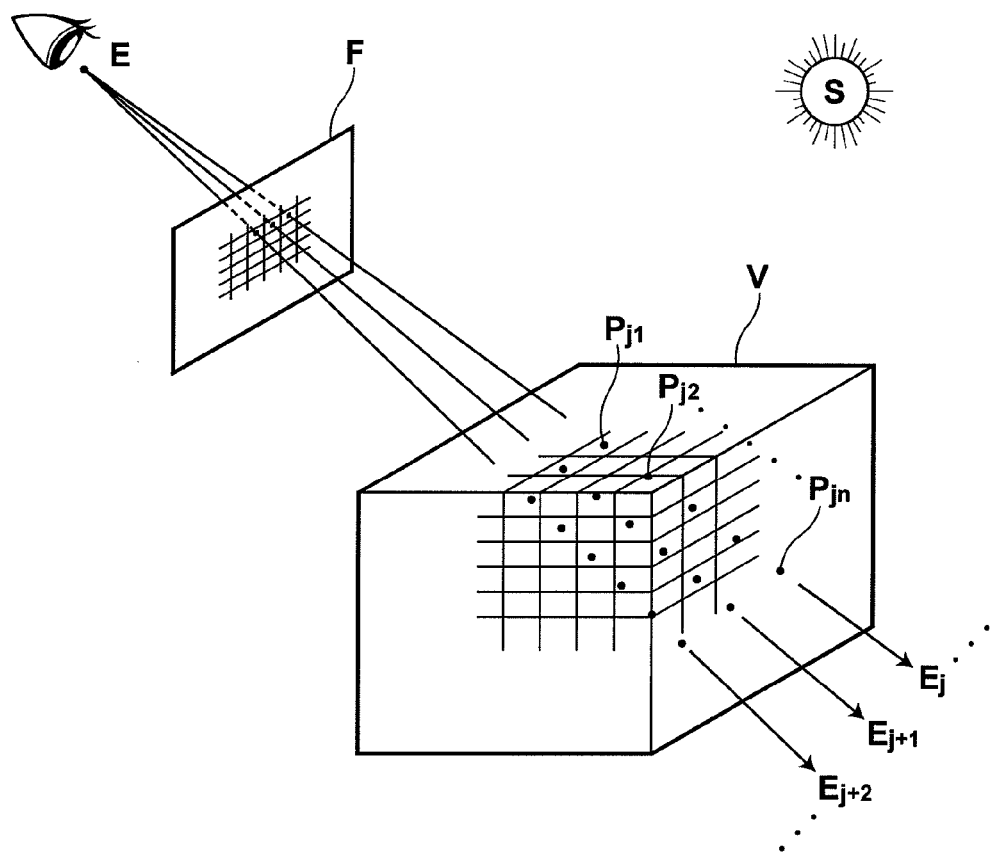
FIG. 3 illustrates an examination point setting process by the ray casting means 60.

Next, ray casting means 60 obtains pixel values (output pixel values) of pixels constituting a volume rendering image. First, a viewpoint E, a light source S, and a projection plane F (size, position and number of pixels) are set by the initialization file, or an input from the radiological reader through the keyboard, mouse or the like. Then, for example, the three-dimensional medical image V is sampled at a predetermined interval along a plurality of visual lines $E_j$ (j=1, 2, - - - L, L is the number of visual lines), each connecting the viewpoint E and each projected pixel on the projection plane F to set a plurality of examination points $P_{ji}$ (i=1, 2, - - - n, n is the number of examination points on the visual line $E_j$), as shown in FIG. 3. Then, along each visual line $E_j$, a brightness value b ($P_{ji}$) and an opacity level α($P_{ji}$) at each examination point $P_{ji}$ are obtained in series by the brightness value determination means 40 and an opacity determination means 30, to be described later. Then, as illustrated in formula (3) below, the product of the brightness value b($P_{ji}$) and opacity level α($P_{ji}$) is added up until the cumulative value of the opacity levels α reaches a predetermined value or the ray penetrates through the target three-dimensional medical image V, and the result of the addition is determined as an output pixel value $C_j$ of the projected pixel on the projection plane where the visual line $E_j$ passes.

$$C_j = \sum_{i=1}^{n} \left( b(P_{ji}) \times \alpha(P_{ji}) \prod_{k=1}^{i-1} (1 - \alpha(P_{jk})) \right) \quad (3)$$

Such processing is performed with respect to each visual line to determine the output pixel value of each projected pixel on the projection plane, thereby a volume rendering image is generated. The generated volume rendering image is displayed on the display of the image processing workstation 3 by the image display means 70.

Next, a processing flow of the brightness value determination means 40 for determining the brightness value b($P_{ji}$) at each examination point $P_{ji}$ will be described.

Figure 4:
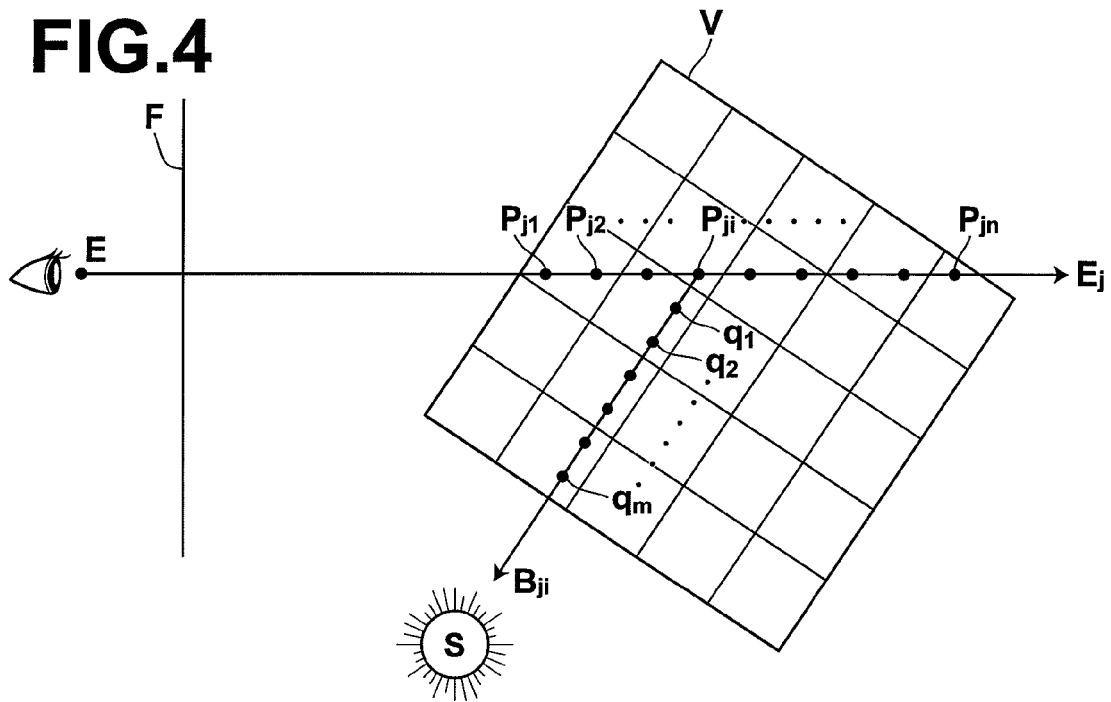
FIG. 4 illustrates a brightness value calculation process by the brightness value calculation means 42.

The brightness value determination means 40 includes the illuminance level calculation means 42 and the brightness value calculation means 43. First, the illuminance level calculation means 42 calculates an illuminance level D ($P_{ji}$) from the light source at each examination point $P_{ji}$. As shown in FIG. 4, the three-dimensional medical image V is sampled along the light ray $B_{ji}$ to set each calculation point $q_k$ (k=1, 2, - - - m, m is number of calculation points on the light ray $B_{ji}$). Then, illuminance level D ($P_{ji}$) from the light source at each examination point $P_{ji}$ is calculated by formula (1) below using the opacity level α($q_k$) at each determined calculation point $q_k$. Here, the calculated illuminance level D ($P_{ji}$) reflects an illuminance drop due to blockage and attenuation of light irradiated on each examination point from the light source S by any other subject image.

$$D(P_{ji}) = \prod_{k=1}^{m} (1 - \alpha(q_k)) \quad (1)$$

Next, the brightness value calculation means 43 calculates the brightness value b ($P_{ji}$) at each examination point, for example, by formula (4) below based on the illuminance level at each examination point $P_{ji}$ calculated in the illuminance level calculation means 42.

$$b(P_{ji}) = D(P_{ji}) \times h(N(P_{ji}) \cdot L) \times c(P_{ji}) \quad (4)$$

where, h is the shading coefficient by diffuse reflection. In the present embodiment, environment light and specular reflection light is not considered, and N ($P_{ji}$) is the normal vector at an examination point $P_{ji}$, which is calculated by formula (5) below.

$$N(P_{ji}) = \frac{\nabla f(P_{ji})}{|\nabla f(P_{ji})|} \quad (5)$$

where, $\nabla f(P_{ji})$ is the gradient of pixel values at the examination point $P_{ji}$, which is obtained by formula (6) below using pixel values of six points adjacent to the examination point $P_{ji}$ in the x, y, or z axis directions.

$$\nabla f(P_{ji}) = \nabla f \begin{pmatrix} x \\ y \\ z \end{pmatrix} = \begin{pmatrix} \frac{f(x+\Delta x, y, z) - f(x-\Delta x, y, z)}{2} \\ \frac{f(x, y+\Delta y, z) - f(x, y-\Delta y, z)}{2} \\ \frac{f(x, y, z+\Delta z) - f(x, y, z-\Delta z)}{2} \end{pmatrix} \quad (6)$$

where, f is the pixel value at the point, and the pixel value of each adjacent point is obtained through linear interpolation of the pixel values of eight voxels constituting a grid that includes the adjacent point. Here, it is expressed as $P_{ji}$=(x, y, z) for clarity.

Further, L is the unit tangent vector from the examination point $P_{ji}$ to the light source S, "•" is the vector inner product, c($P_{ji}$) is the allocated color information based on the color information defined with respect to each tissue (each input pixel value, such as hounsfield number) of a subject.

So far the description has been made of a case in which the normal vector to a plane defined by a gradient of pixel values at each examination point is determined as the normal vector to the examination point. But the normal vector may be determined by other methods. For example, the normal vector may be determined based on a plane defined by a gradient of opacity levels at the examination point, other than the gradient of pixel values at the examination point.

Next, processing of the opacity level determination means 50 for determining an opacity level α($P_{ji}$) at each examination point $P_{ji}$ will be described. The opacity level α($P_{ji}$) at each examination point $P_{ji}$ is determined by the pixel value at the examination point $P_{ji}$ based on the opacity level predefined with respect to each tissue (each input pixel value, such as hounsfield number) of a subject. The pixel value at each examination point $P_{ji}$ is obtained through linear interpolation of the pixel values of eight voxels constituting a grid that includes the examination point.

The brightness value determination process and the opacity level determination process are independent processes, so that either of them may be performed first when they are performed serially, or they may be performed in parallel.

Figure 5A:
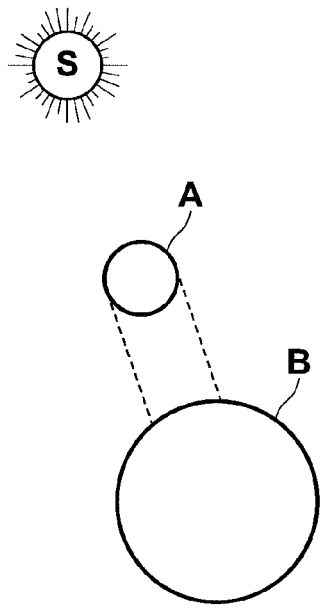
FIG. 5A is a drawing for explaining a pseudo three-dimensional image generated by the image processing of the present invention.
Figure 5B:
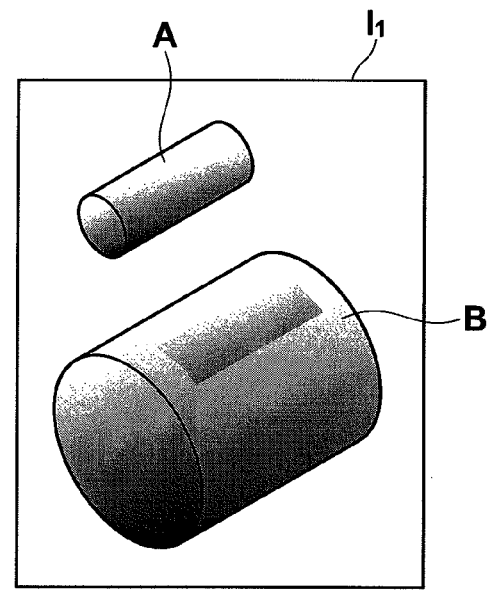
FIG. 5B illustrates an example pseudo three-dimensional image generated by the image processing of the present invention.
Figure 6A:
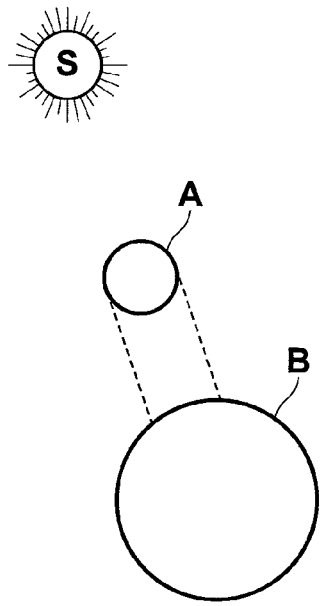
FIG. 6A is a drawing for explaining a pseudo three-dimensional image generated by the conventional image processing method.
Figure 6B:
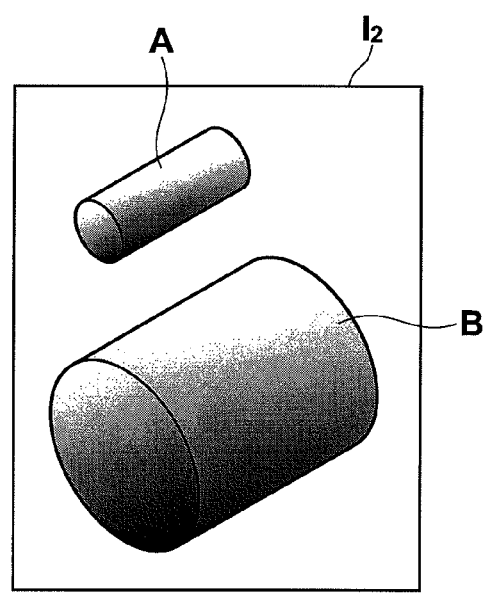
FIG. 6B illustrates an example pseudo three-dimensional image generated by the conventional image processing method.

As described above, when generating a pseudo three-dimensional image by the volume rendering method, the three-dimensional medical image processing system, which is an embodiment of the image processing of the present invention, performs a shading process in which luminance attenuation at each point on a three-dimensional image caused by blockage of light emitted from the light source toward the point by any other subject image is considered. Consequently, for example, in a case where a portion of light emitted from a light source S for illuminating a subject B is blocked by a subject A and a shadow of the subject A appears on the subject B, as shown in FIG. 5A, such shadow is rendered on a pseudo three-dimensional image $I_1$ generated by the volume rendering, as shown in FIG. 5B, so that a high fidelity pseudo three-dimensional image may be generated.

In the embodiment described above, the image processing and image display are performed by the image processing workstation 3. But a configuration may be adopted in which the image processing is performed by an image processing server provided separately and linked to the network 9. This facilitates distributed processing, and when, for example, the image is displayed on a plurality of terminals, this eliminates the need to provide a plurality of high-performance image processing workstations, resulting in an overall system cost reduction.

What is claimed is:

1. An image processing method for generating a pseudo three-dimensional image by a volume rendering method in which a pixel value of each pixel on a projection plane on which a three-dimensional image illuminated by an arbitrary light source is projected is determined using a brightness and an opacity level value at each examination point, which is a point on the three-dimensional image sampled along each of a plurality of visual lines connecting an arbitrary viewpoint and each pixel on the projection plane, wherein the opacity level at each examination point is determined by the pixel value at the examination point based on a correspondence between each pixel value and an opacity level predefined with respect to said each pixel value, the method comprising the steps of:

calculating an illuminance level at each examination point based on an opacity level at each calculation point, which is a point on the three-dimensional image sampled along each of a plurality of light rays connecting the light source and each examination point, wherein the opacity level at each calculation point is determined by the pixel value at the calculation point based on the correspondence between each pixel value and an opacity level predefined with respect to said each pixel value, and wherein the illuminance level includes an illuminance drop due to blockage and attenuation of light from the light source by another object; and determining the brightness value at each examination point based on the calculated illuminance level.

2. The image processing method according to claim 1, wherein when each of the visual lines is represented by visual line $E_j$ (j=1, 2, - - -, L), each examination point, which is a point on the three-dimensional image sampled along the visual line $E_j$, is represented by examination point $P_{ji}$ (i =1, 2, - - -, n), each calculation point, which is a point on the three-dimensional image sampled along the light ray connecting the light source and the examination point $P_{ji}$, is represented by calculation point $q_k$ (k =1, 2, - - -, m), and the opacity level at the calculation point $q_k$ is represented by $\alpha(q_k)$, an illuminance level D ($P_{ji}$) at the examination point $P_{ji}$ is calculated by formula (1) below $$D(P_{ji}) = \prod_{k=1}^{m} (1 - \alpha(q_k)) \quad (1)$$

where L is the number of visual lines, n is the number of examination points on the visual line $E_j$, and m is the number of calculation points on the ray connecting the light source and the examination point $P_{ji}$.

3. An image processing apparatus for generating a pseudo three-dimensional image by a volume rendering method having a ray casting means for determining a pixel value of each pixel on a projection plane on which a three-dimensional image illuminated by an arbitrary light source is projected using a brightness value and an opacity level at each examination point, which is a point on the three-dimensional image sampled along each of a plurality of visual lines connecting an arbitrary viewpoint and each pixel on the projection plane, wherein the opacity level at each examination point is determined by the pixel value at the examination point based on a correspondence between each pixel value and an opacity level predefined with respect to said each pixel value, the apparatus comprising:

an illuminance level calculation means for calculating an illuminance level at each examination point based on an opacity level at each calculation point, which is a point on the three-dimensional image sampled along each of a plurality of light rays connecting the light source and each examination point, wherein the opacity level at each calculation point is determined by the pixel value at the calculation point based on the correspondence between each pixel value and an opacity level predefined with respect to said each pixel value, and wherein the illuminance level includes an illuminance drop due to blockage and attenuation of light from the light source by another object; and a brightness value determination means for determining the brightness value at each examination point based on the calculated illuminance level.

4. The image processing apparatus according to claim 3, wherein when each of the visual lines is represented by visual line $E_j$ (j=1, 2, - - -, L), each examination point, which is a point on the three-dimensional image sampled along the visual line $E_j$, is represented by examination point $P_{ji}$ (i =1, 2, - - -, n), each calculation point, which is a point on the three-dimensional image sampled along the light ray connecting the light source and the examination point $P_{ji}$ is represented by calculation point $q_k$ (k =1, 2, - - -, m), and the opacity level at the calculation point $q_k$ is represented by $\alpha(q_k)$, an illuminance level D ($P_{ji}$) at the examination point $P_{ji}$, is calculated by formula (1) below $$D(P_{ji}) = \prod_{k=1}^{m} (1 - \alpha(q_k)) \quad (1)$$

where L is the number of visual lines, n is the number of examination points on the visual line $E_j$, and m is the number of calculation points on the ray connecting the light source and the examination point $P_{ji}$.

5. A non-transitory computer readable recording medium storing a program including instructions for causing a computer to perform an image processing method for generating a pseudo three-dimensional image by a volume rendering method in which a pixel value of each pixel on a projection plane on which a three-dimensional image illuminated by an arbitrary light source is projected is determined using a brightness value and an opacity level at each examination point, which is a point on the three-dimensional image sampled along each of a plurality of visual lines connecting an arbitrary viewpoint and each pixel on the projection plane, wherein the opacity level at each examination point is determined by the pixel value at the examination point based on a correspondence between each pixel value and an opacity level predefined with respect to said each pixel value, the method comprising the steps of:

calculating an illuminance level at each examination point based on an opacity level at each calculation point, which is a point on the three-dimensional image sampled along each of a plurality of light rays connecting the light source and each examination point, wherein the opacity level at each calculation point is determined by the pixel value at the calculation point based on the correspondence between each pixel value and an opacity level predefined with respect to said each pixel value, and wherein the illuminance level includes an illuminance drop due to blockage and attenuation of light from the light source by another object; and determining the brightness value at each examination point based on the calculated illuminance level.

* * * * *